United States Patent
Kim et al.

(10) Patent No.: US 9,906,339 B2
(45) Date of Patent: Feb. 27, 2018

(54) METHOD AND APPARATUS FOR COMMUNICATION TO PREVENT COMMUNICATION LINK FAILURE IN MILLIMETER BAND COMMUNICATION SYSTEM

(71) Applicant: Electronics and Telecommunications Research Institute, Daejeon (KR)

(72) Inventors: Junhyeong Kim, Daejeon (KR); Il Gyu Kim, Okcheon-gun Chungcheongbuk-do (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/926,348

(22) Filed: Oct. 29, 2015

(65) Prior Publication Data

US 2016/0127170 A1    May 5, 2016

(30) Foreign Application Priority Data

Oct. 29, 2014   (KR) .................. 10-2014-0148685

(51) Int. Cl.

| | | |
|---|---|---|
| H04W 72/04 | (2009.01) | |
| H04L 5/00 | (2006.01) | |
| H04W 36/00 | (2009.01) | |
| H04B 7/026 | (2017.01) | |
| H04L 12/24 | (2006.01) | |
| H04W 88/04 | (2009.01) | |
| H04W 88/08 | (2009.01) | |

(Continued)

(52) U.S. Cl.
CPC ........... *H04L 5/0035* (2013.01); *H04B 7/026* (2013.01); *H04L 41/0668* (2013.01); *H04W 36/00* (2013.01); *H04L 43/0811* (2013.01); *H04W 8/186* (2013.01); *H04W 88/04* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 5,991,629 | A * | 11/1999 | Agrawal | H04W 16/06 455/441 |
| 2009/0253380 | A1 * | 10/2009 | Ko | H04B 7/043 455/68 |
| 2012/0127916 | A1 | 5/2012 | Sangkeun et al. | |

(Continued)

FOREIGN PATENT DOCUMENTS

| | | |
|---|---|---|
| KR | 1020110008703 A | 1/2011 |
| KR | 1020120089904 A | 8/2012 |

*Primary Examiner* — Brandon Renner
(74) *Attorney, Agent, or Firm* — William Park & Associates Ltd.

(57) ABSTRACT

Disclosed is a method and apparatus for communication in a millimeter band communication system. In a case in which a first terminal obtains a list including members of a cooperative group in which terminals receive a service with the same beam as a first terminal's beam, the first terminal informs a second terminal, corresponding to a member of the list, of communication link failure when the failure occurs, and requests a cooperative service. After that, the first terminal receives information on the service from a base station through the second terminal.

17 Claims, 5 Drawing Sheets

(51) Int. Cl.
*H04W 8/18* (2009.01)
*H04L 12/26* (2006.01)

(56) References Cited

U.S. PATENT DOCUMENTS

| | | | |
|---|---|---|---|
| 2012/0157139 A1* | 6/2012 | Noh | H04W 72/0406 |
| | | | 455/501 |
| 2015/0109903 A1* | 4/2015 | Nasir | H04L 41/5074 |
| | | | 370/221 |
| 2015/0124613 A1* | 5/2015 | Yu | H04W 36/0016 |
| | | | 370/235 |
| 2016/0094363 A1* | 3/2016 | Ravi | H04L 12/46 |
| | | | 370/401 |
| 2017/0201918 A1* | 7/2017 | Kim | H04W 36/08 |

* cited by examiner

METHOD AND APPARATUS FOR COMMUNICATION TO PREVENT COMMUNICATION LINK FAILURE IN MILLIMETER BAND COMMUNICATION SYSTEM

CROSS-REFERENCE TO RELATED APPLICATION

This application claims priority to and the benefit of Korean Patent Application No. 10-2014-0148685 filed in the Korean Intellectual Property Office on Oct. 29, 2014, the entire contents of which are incorporated herein by reference.

BACKGROUND OF THE INVENTION (a) Field of the Invention

The present invention relates to a communication method and apparatus for preventing communication link failure in a millimeter band communication system.

(b) Description of the Related Art

A super high frequency (SHF) band is about 3~30 GHz and an extremely high frequency (EHF) band is about 30~300 GHz. The EHF band includes electromagnetic waves which have a wavelength of a millimeter unit. The frequency of the SHF/EHF band has different characteristics from those of the frequency of the band used in the prior mobile communication.

The SHF/EHF band has merits as follows. The size of a wavelength is very small, and thereby it is possible to miniaturize the antenna for transmitting/receiving and a device, and also to reduce weight thereof. In addition, a wider channel bandwidth than the frequency bandwidth of the prior communication is provided, and thereby the amount of information transferred can be significantly increased. Accordingly, the SHF/EHF band is likely to be used as a communication frequency of the next generation mobile communication system such as a wideband code division multiple access (WCDMA), a long term evolution (LTE), and others.

On the other hand, the SHF/EHF band has propagation characteristics of strong straightness, which may increase a frequency reuse rate while being subjected to severe interference by obstacles, and may be sensitive to the atmospheric environment such that path loss of signals increases and it may be somewhat unsuitable for long distance communication.

Due to the propagation characteristics of the SHF/EHF band, unlike the prior mobile communication system such as the WCDMA, the LTE, and others, there is no multi-path channel caused by reflection at an independent path. Therefore, communication is impossible if line-of-sight (LOS) is not ensured.

In a mobile communication system, channels are often changed due to instantaneous movement or motion of things around a user (a receiving terminal) or the users own instantaneous movement or motion, and thereby the LOS is not always ensured. Accordingly, communication link failure often occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus having advantages of enabling communication even if communication link failure occurs by unanticipated instantaneous movement or motion of things around a terminal or the terminal users own instantaneous movement or motion, in a mobile communication system of a millimeter band.

An exemplary embodiment of the present invention provides a method for communication in a millimeter band communication system. The method includes: obtaining, by a first terminal, a list including members of a cooperative group in which terminals receive a service with the same beam as the first terminal's beam; informing, by the first terminal, a second terminal, corresponding to a member of the list, of communication link failure when the failure occurs, and requesting a cooperative service; and receiving, by the first terminal, information corresponding to a service provided from a base station through the second terminal.

The obtaining of a list may include: searching, by the first terminal, terminals receiving a service with the same beam as the first terminal's beam by signaling at a predetermined period or when recognizing its movement or motion; requesting, by the first terminal, the searched terminals to be registered as members of its cooperative group; and registering, by the first terminal, the terminals informing of accepting the request as members of the cooperative group, and storing them in the list.

The obtaining of a list may perform searching and registering a cooperative group member for in-band terminals, and may further perform searching and registering a cooperative group member for out-band terminals.

The requesting of a cooperative service may include selecting an optimal member from among the list; and informing the selected optimal member of communication link failure and requesting a cooperative service. The selecting of an optimal member may include selecting optimal members of a predetermined number in consideration of channel links between the base station and the cooperative group members of the list and channel links between the first terminal and the cooperative group members.

The method may further include calculating beam-forming information that includes a beam index of each of the cooperative group members of the list or phase information for beam-forming.

Beam-forming information on an optimal member among the cooperative group members of the list may be calculated and stored.

The method may further include: requesting, by the first terminal, a cooperative service from a third terminal having a cooperative group in which the first terminal is included as a member; informing, by the first terminal, the base station of the third terminal's communication link failure and requesting a service for the third terminal through a radio resource allocated to the first terminal; and receiving, by the first terminal, the service for the third terminal from the base station and sending the service to the third terminal.

The receiving of the service may include receiving the service through a radio resource additionally allocated to the first terminal and sending the service to the third terminal.

Another embodiment of the present invention provides an apparatus for a terminal to communicate in a millimeter band communication system. The apparatus includes: a cooperative group searching processer that searches members of a cooperative group including terminals which receive a service through the same beam; a member list storage that stores a list of the members of the cooperative group; a communication processer that selects a member from the list when communication link failure occurs, informs a terminal corresponding to the selected member of the communication link failure, and requests a cooperative service; and an information receiver that receives information corresponding to a service from a base station through the corresponding terminal from the selected member.

The apparatus may further include a member registration processor that requests a searched terminal to be a member of the cooperative group, and registers the terminal when informing of acceptance of the request as a member of the cooperative group.

The apparatus may further include an optimal member selecting processor that selects an optimal member from the list. The communication processor may inform a terminal corresponding to the selected optimal member of communication link failure and request a cooperative service.

The optimal member selecting processor may select the optimal member of a predetermined number in consideration of channel links between the base station and the cooperative group members of the list and channel links between the terminal of the apparatus and the cooperative group members.

The apparatus may further include a beam-forming calculation processor that calculates beam-forming information that includes a beam index of each of the cooperative group members of the list or phase information for beam-forming.

The list may include a cooperative group member list of in-band terminals and a cooperative group member list of out-band terminals.

The optimal member selecting processor may first perform a process of selecting an optimal member from the cooperative group member list of in-band terminals, and then process a process of selecting an optimal member from the cooperative group member list of out-band terminals when there is no optimal member in the cooperative group member list of in-band terminals.

The apparatus may further include: a cooperative group request processor that determines whether or not to accept a request when receiving the request for cooperative group member registration from an adjacent terminal, and informs the results of the determination; and a cooperative service request processor that requests the base station to provide a service for the adjacent terminal accepting the request for cooperative group member registration when the adjacent terminal informs of communication link failure, receives the service, and transmits it to the adjacent terminal.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, the word "comprise" and variations such as "comprises" or "comprising" will be understood to imply the inclusion of stated elements but not the exclusion of any other elements.

In this specification, a terminal may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the MT, the MS, the AMS, the HR-MS, the SS, the PSS, the AT, the UE, etc.

A base station (BS) may designate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (HR-RS) serving as a base station, a high reliability relay station (HR-RS) serving as a base station, a small base station (a femto BS, a home node B (HNB), a home eNodeB (HeNB), a pico BS, a metro BS, a micro BS, etc.), etc., and may include all or some functions of the ABS, the nodeB, the eNodeB, the AP, the RAS, the BTS, the MMR-BS, the RS, the RN, the ARS, the HR-RS, the small base station, etc.

Hereinafter, a communication method and apparatus for preventing communication link failure according to an exemplary embodiment of the present invention will be described.

Figure 1:
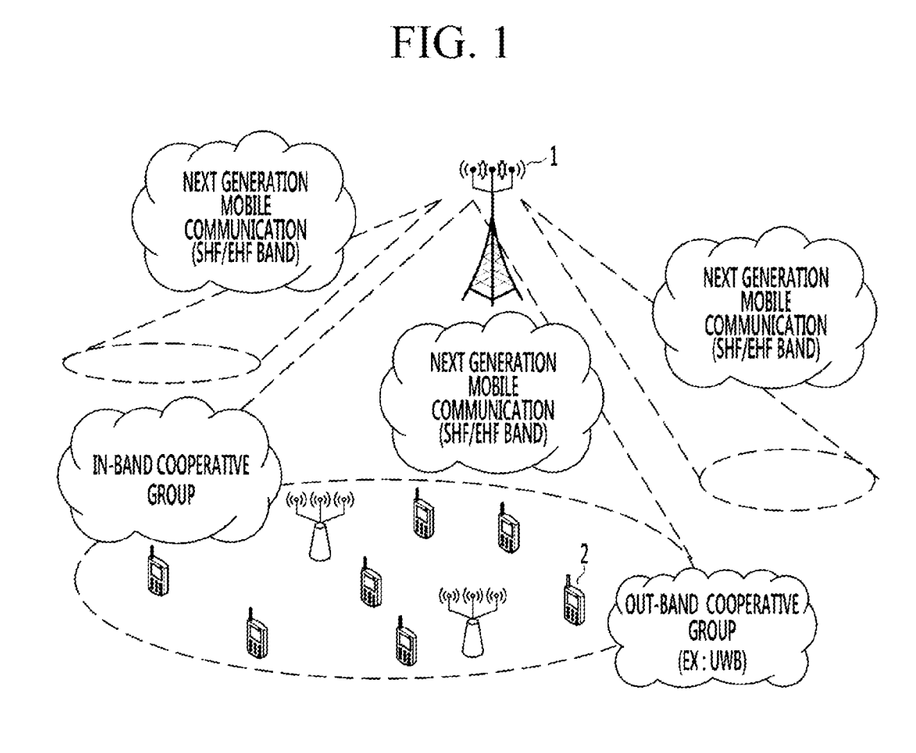
FIG. 1 shows a network environment according to an exemplary embodiment of the present invention.

FIG. 1 shows a network environment according to an exemplary embodiment of the present invention.

A millimeter band system according to an exemplary embodiment of the present invention, that is, a super high frequency/extremely high frequency (SHF/EHF) band communication system, communicates based on beam-forming. As shown in FIG. 1, a base station 1 performs beam-forming with SHF/EHF band for a terminal 2 to maximize spectrum efficiency. Since there is no interference between beams generated for the terminal 2 by the base station 1, the same frequency bandwidth can be used.

In the prior mobile communication system, it is possible to communicate through a non-line-of-sight (NLOS) signal received through a multipath although a line-of-sight (LOS) signal is not obtained. However, in a mobile communication system with the SHF/EHF band, it may be difficult to communicate if the LOS signal is not obtained because of interference with obstacles due to a strong straight wave characteristic.

Figure 2:
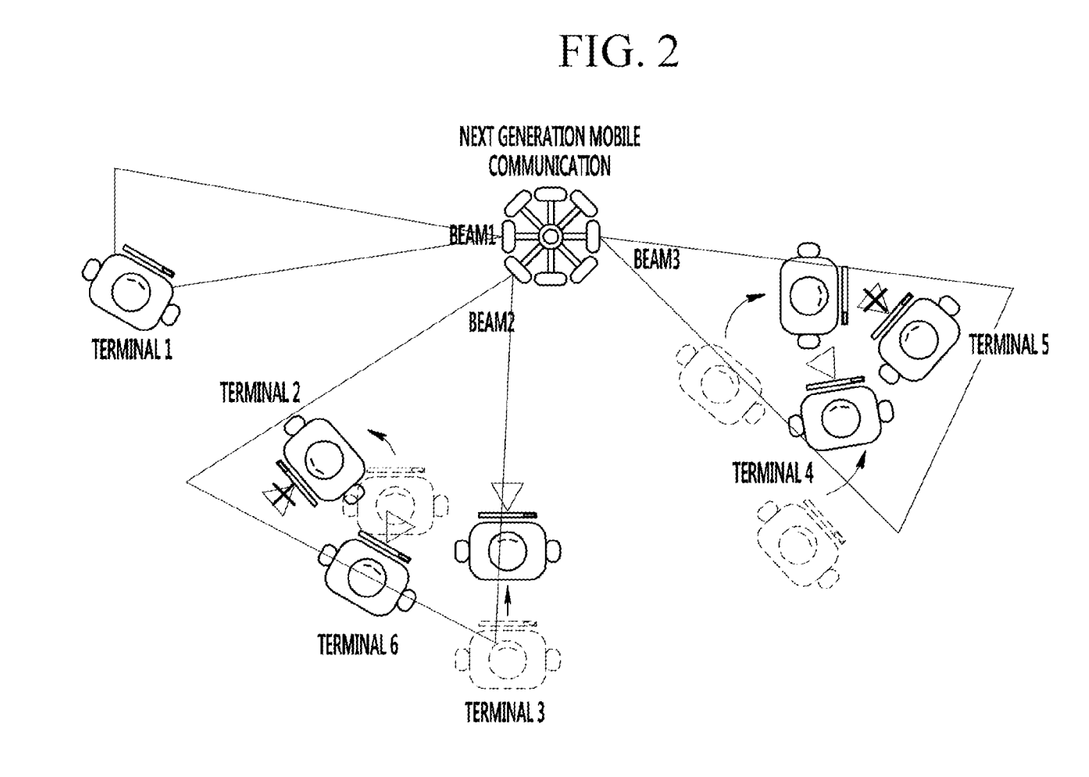
FIG. 2 shows a case in which communication link failure occurs.

FIG. 2 shows an example of a case in which communication link failure occurs.

A signal of the SHF/EHF band cannot move on or be transmitted through obstacles due to its wave characteristics when encountering obstacles. As shown in FIG. 2, a communication link is blocked by instantaneous movement and motion of things (e.g., a vehicle or person) around a terminal or a communication link is blocked by terminal's instantaneous motion, and thereby it is impossible to communicate.

It is assumed that a terminal 1 to a terminal 6, as shown in FIG. 2, are receiving services through beams generated by beam-forming of a base station. That is, terminal 1 is receiving a service through a beam 1, terminals 2, 3, and 6 are receiving a service through a beam 2, and terminals 4 and 5 are receiving a service through a beam 3. In such a service receiving environment, if the terminals 2 and 5 being serviced through the beams 2 and 3 respectively instantaneously exhibit movements or motions or things (e.g., a vehicle or person) around the terminals 2 and 5 instantaneously exhibit movement or motion, an LOS communication link is blocked and thereby communication stops. The communication link blocking is unexpected by the base station or the terminals. The terminals 2 and 5 have no way to inform the base station because there is no other multipath NLOS link. That is, the base station cannot receive a signal through uplink communication from a terminal and thereby cannot know the situation of the terminals.

Therefore, according to an exemplary embodiment of the present invention, cooperative communication between members of a cooperative communication network group that share the same beam is performed when communication is not performed since a communication link is blocked or the strength of the received signal is very weak due to unexpected movement or motion of terminals. The changes such as the unexpected movement or motion of terminals in an exemplary embodiment of the present invention represent the case that a base station cannot handle in advance due to unpredictable and exceptional situations. The changes in predictable range presuppose that the base station is capable of handling them. In an exemplary embodiment of the present invention, it will be described that communication is performed by a base station when a communication link is blocked due to the unexpected changes.

Meanwhile, the cooperative communication network group represents a communication network group of in-band or out-band. The in-band represents a frequency bandwidth allocated by a mobile communication system and the out-band represents bands except for the allocated frequency bandwidth.

Figure 3:
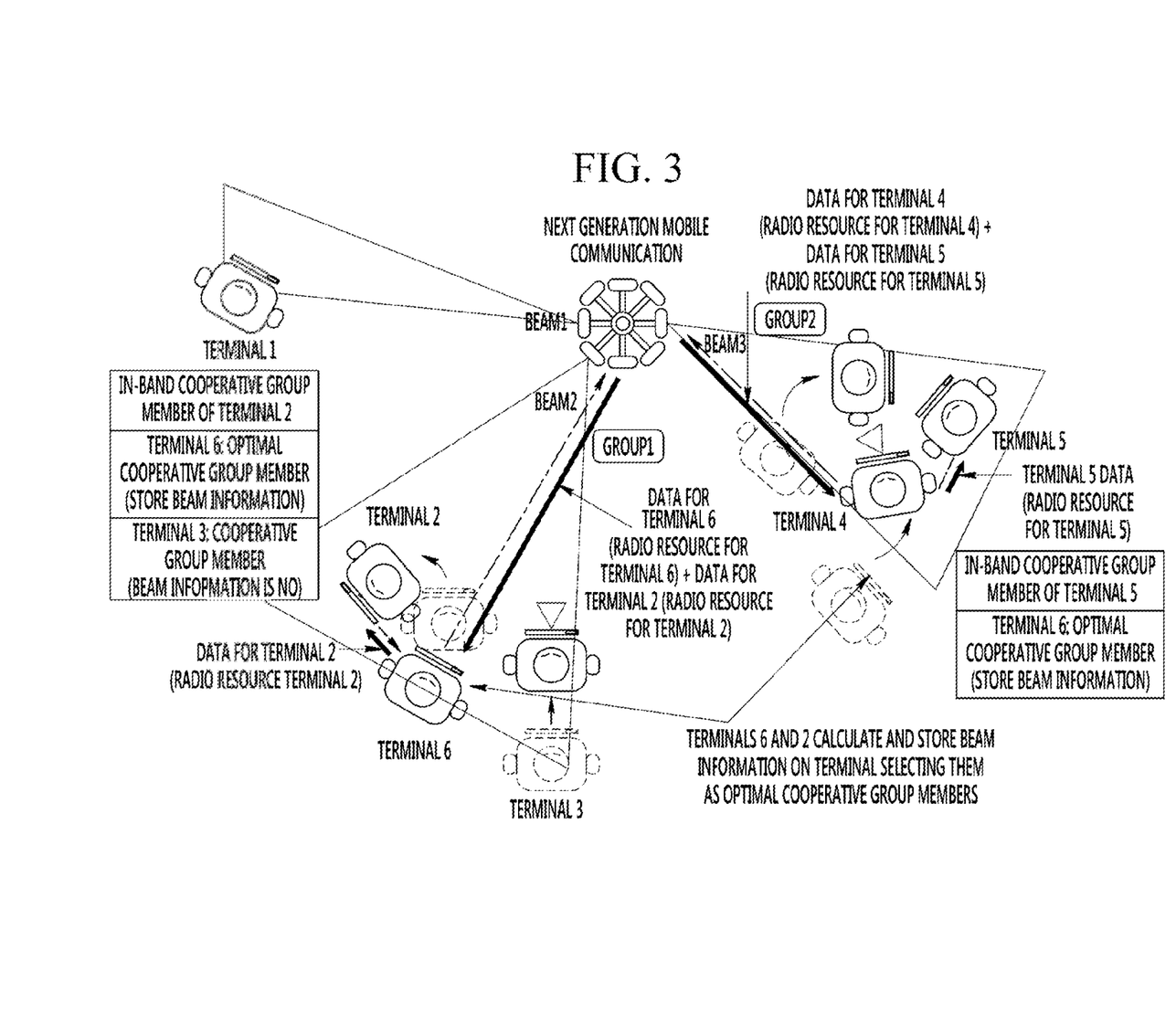
FIG. 3 shows a concept of a method for communication according to an exemplary embodiment of the present invention.

FIG. 3 shows a concept of a communication method according to an exemplary embodiment of the present invention.

In an exemplary embodiment of the present invention, as shown in FIG. 3, a terminal searches terminals being serviced through the same beam by periodic signaling and requests them to register as a member of a cooperative communication network group. The terminal registers terminals accepting the request as members of the cooperative communication network group and manages the list of the members. The terminals included in the list will be referred to as an "in-band cooperative group members" for convenience of explanation. The in-band cooperative group members may change from time to time so that the list may be updated at predetermined intervals.

The list of in-band cooperative group members is updated at predetermined intervals or is updated through signaling between terminals when the instantaneous motion of terminals is recognized. For example, in an environment of FIG. 2, a terminal 5 is capable of immediately performing cooperative communication by using the periodically updated in-band cooperative group members and beam-forming information because other terminals move, while a terminal 2 needs to be updated in the list of in-band cooperative group members and update beam-forming information before performing cooperative communication because of moving itself. Accordingly, it is needed to recognize its instant motion and update the list of cooperative group members and the beam-forming information when recognizing the instant motion, in addition to updating the list at predetermined intervals. Therefore, when the terminal's instant motion is recognized, the cooperative group members and the beam-forming information are updated at the same time. A method of recognizing the terminal's instant motion may use a gyroscope sensor mounted in a terminal, which is known to a person of ordinary skill in the art, and thereby detailed description of the method will be omitted.

Meanwhile, a terminal searches and updates its in-band cooperative group members as well as the out-band cooperative group members at the same time, and generates the list of the out-band cooperative group members and stores and manages it. The searching and registering of the out-band cooperative group members may be performed in the same way as that of searching and registering the in-band cooperative group members. The out-band cooperative group members are terminals that are serviced through the same beam. Relays which are installed within beam coverage may also be members of the in-band/out-band cooperative group members.

In FIG. 3, the terminals 2, 3, and 6 are serviced through the beam 2 which is generated by the beam-forming of the base station, and the terminal 2 has the in-band cooperative group 1 obtained by the periodic searching and updating. The terminals 5 and 4 are serviced through the beam 3 which is generated by the beam-forming of the base station, and have the in-band cooperative group 2. The members of the in-band cooperative group of the terminals 2 and 5 in which a communication link is blocked are shown in FIG. 3. In addition, other terminals may be within beam coverage.

The terminal 2 in which a communication link is blocked due to its instant motion selects an optimal member from among the predetermined in-band cooperative group 1. The terminal 2 informs the base station of communication link blocking through the selected member (e.g., a terminal 6), and requests to be serviced through cooperation with the selected member.

The base station receives the request from the terminal 6, and then allocates a radio resource for the terminal 2 to the terminal 6. The base station transmits the information of the terminal 2 through the allocated radio resource for the terminal 2 to the terminal 6, and simultaneously transmits the information of the terminal 6 through the prior radio resource for the terminal 6 to the terminal 6. The terminal 6 relays the information of the terminal 2 received from the base station through the radio resource for the terminal 2 to the terminal 2.

The terminal 5 is serviced through the cooperation with the terminal 4 as described above.

The data transmission traffic may be maintained even if a terminal is serviced through the cooperation with another terminal. Accordingly, enough bandwidth for the out-band may be provided like the in-band (e.g., an SHF/EHF band of the next generation mobile communication). An example of a suitable out-band may be an ultra wideband (UWB).

Meanwhile, when a terminal receives information from a member of the in-band cooperative group, it is fine if the terminal and the member are close, but if they are away from each other, beam-forming may be performed due to the frequency characteristic of SHF/EHF.

For rapid beam-forming in an exemplary embodiment of the present invention, a terminal searches and updates the in-band cooperative group members, and generates the information of beam-forming information (e.g., a beam index, phase information for beam-forming, and others) and updates it at the same time and at predetermined intervals. The complexity of the terminal beam-forming information on all cooperative group members increases so that the terminal may have beam-forming information on optimal cooperative group members of a predetermined number. Here, the optimal cooperative group member may be selected in consideration of a channel link between the member of the cooperative group and the base station and a channel link between the member of the cooperative group and the corresponding terminal. The optimal cooperative group member may be selected based on the condition of $$i^* = \arg\max_{i} \{\min\{SNR_{basestation \leftrightarrow i}, SNR_{i \leftrightarrow terminal}\}\}.$$

Here, i represents an index of a terminal and represents a selected optimal cooperative group member. $SNR_{basestation \leftrightarrow i}$ represents a signal-to-noise ratio (SNR) of a channel between a base station and a relay terminal (which is a cooperative group member and will also be referred to as a cooperative terminal), and $SNR_{i \leftrightarrow terminal}$ represents an SNR of a channel between a relay terminal and a terminal. According to the condition, the relay terminal, that is, the cooperative terminal making the minimum value of the SNR of the channel between the cooperative terminal and the base station and the minimum value of the SNR of the channel between the cooperative terminal and the terminal to be maximized may be selected as an optimal cooperative terminal. However, the present invention is not restricted thereto.

The number of the optimal cooperative group members may be determined in consideration of the hardware performance of a terminal and signaling complexity for beam-forming searching. In FIG. 3 the number of the optimal cooperative group member is one for convenience of drawing.

A terminal generates and manages beam-forming information on the optimal cooperative group members as described above, and the cooperative group member may generate and manage beam-forming information on the terminal of selecting it as an optimal cooperative group member.

Through this, as shown in FIG. 3, when determining that it is impossible to communicate due to communication link blocking, the terminal 2 or 5 informs the first cooperative group member (the cooperative group member of the terminal 2 is the terminal 6 and the cooperative group member of the terminal 5 is the terminal 4) of communication link blocking. The terminal 6 informs the base station that the terminal 2 cannot communicate due to the communication link blocking and requests that the base station transmits the data of the terminal 2 to the terminal 6 through the allocated radio resource for the terminal 2. Also, the terminal 4 informs the base station that the terminal 5 cannot communicate due to the communication link blocking and requests the base station to transmit the data of the terminal 5 to the terminal 4 through the allocated radio resource for the terminal 2.

According to the requests, the base station transmits the data of the terminals 2 and 5 to the terminal 6 and the terminal 4, respectively. After that, the terminals 6 and 4 send the data of the terminals 2 and 5 to terminals 2 and 5, respectively, without a process of generating beam-forming information (e.g., beam searching).

Meanwhile, if the communication with the first cooperative group member has an large interference effect on other terminals within the same beam or terminals within different beams, a member of the following ranking may be selected from the cooperative group members as an optimal cooperative member. Also, if the in-band cooperative group members are not searched, communication with the optimal cooperative member of the out-band cooperative group is performed as described above. At this time, communication through the out-band may be performed in the link between terminals (terminal 6→germinal 2, terminal 4→germinal 5). Also, in the worst case in which communication is impossible because the in-band/out-band cooperative group members are not both searched, communication through cellular bands may be performed.

A communication method according to an exemplary embodiment of the present invention will be described as follows.

Figure 4:
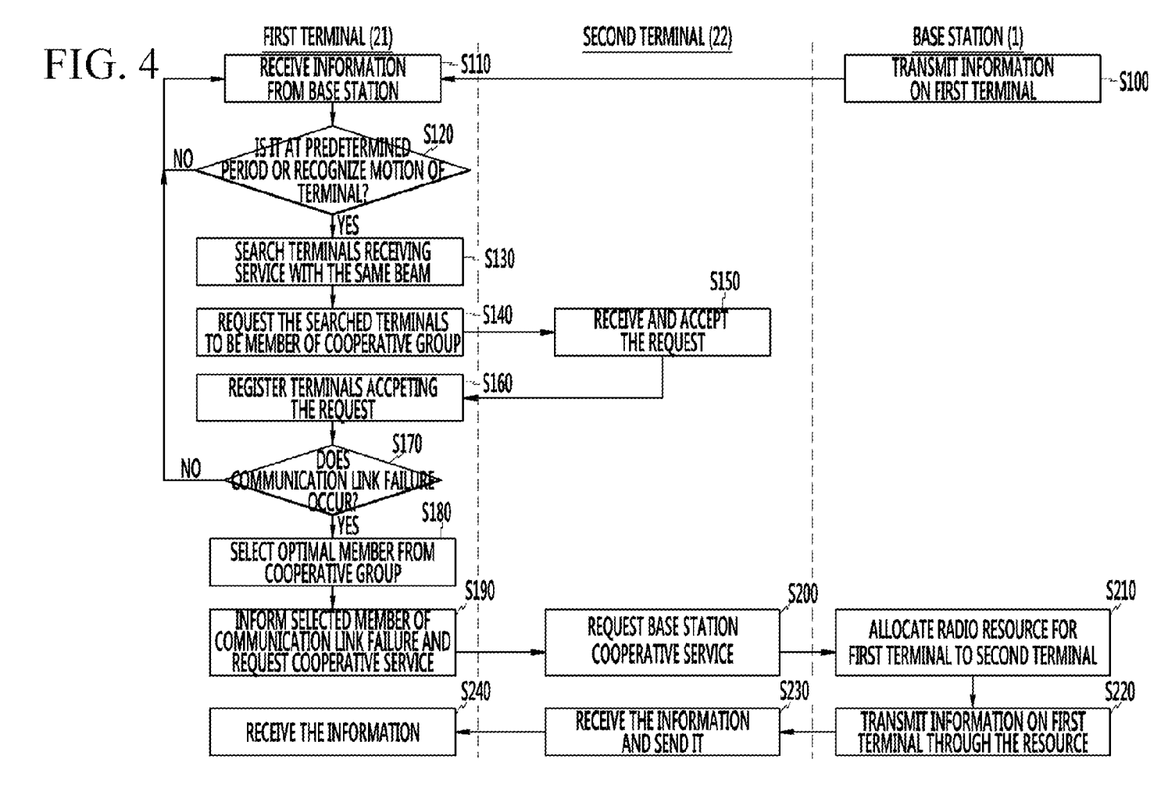
FIG. 4 shows a flowchart of a method for communication according to an exemplary embodiment of the present invention.

FIG. 4 shows a flowchart of a communication method according to an exemplary embodiment of the present invention.

Here, it is assumed that a first terminal 21 and a second terminal 22 are designated as a cooperative group, and they receive a service through a base station 1.

As shown in FIG. 4, the base station 1 transmits information on the first terminal 21 (S100), and the first terminal 21 receives the information from the base station 1 (S110). The first terminal 21 searches terminals receiving a service through the same beam as it has when recognizing its movement or motion or at a predetermined period (S120, S130), and requests the searched terminal to be registered as a member of its cooperative group (S140). If the second terminal 22 that is one of the searched terminals receives the request for member registration and then transmits a response of accepting the request (S150), the first terminal 21 registers the second terminal 22 as a member of the cooperative group, and stores and manages the information on the member list (S160). Here, in addition to the searching and registration of the in-band cooperative group, the searching and registration of the out-band cooperative group may be performed. For prompt beam-forming, the first terminal may calculate and store beam-forming information (ex., a beam index or phase information for beam-forming) along with searching and registering the cooperative group.

From then, the first terminal 21 selects an optimal member from the list when communication link failure occurs due to the first terminal's instantaneous motion or the instantaneous motion of things around the first terminal 21 (S170 and S180). At this time, the first terminal 21 may select an optimal member from the pre-stored in-band cooperative group and may select an optimal member from the out-band cooperative group if there is no optimal member in the pre-stored in-band cooperative group. The optimal member may be selected by the predetermined number (the optimal number of cooperative group members) in consideration of channel links between the base station and the cooperative group members and channel links between a corresponding terminal and the cooperative group members. It is assumed that the second terminal 22 is selected as the optimal member, which will now be described.

The first terminal 21 informs the selected optimal member, that is, the second terminal 22, of communication link failure and requests a cooperative service (S190). The second terminal 22 requests the cooperative service from the base station 1 according to the informing of communication link failure (S200).

The base station 1 receives the request of the cooperative service from the second terminal 22 and then further allocates a radio resource for the first terminal 21 to the second terminal 22 (S210). Then, the base station 1 transmits information on the first terminal 21 through the allocated radio resource. Also, the base station 1 transmits information on the second terminal 22 through the radio resource that is allocated to the second terminal 22 (S220).

The second terminal 22 receives the information on the first terminal 21 through the further allocated radio resource (S230) and transmits the information to the first terminal 21 (S240). Accordingly, the first terminal 21 may receive the information for itself from the base station 1 through the second terminal 22. At that time, the first terminal 21 may receive the information from the base station 1 by using the pre-generated beam-forming information for the second terminal.

Figure 5:
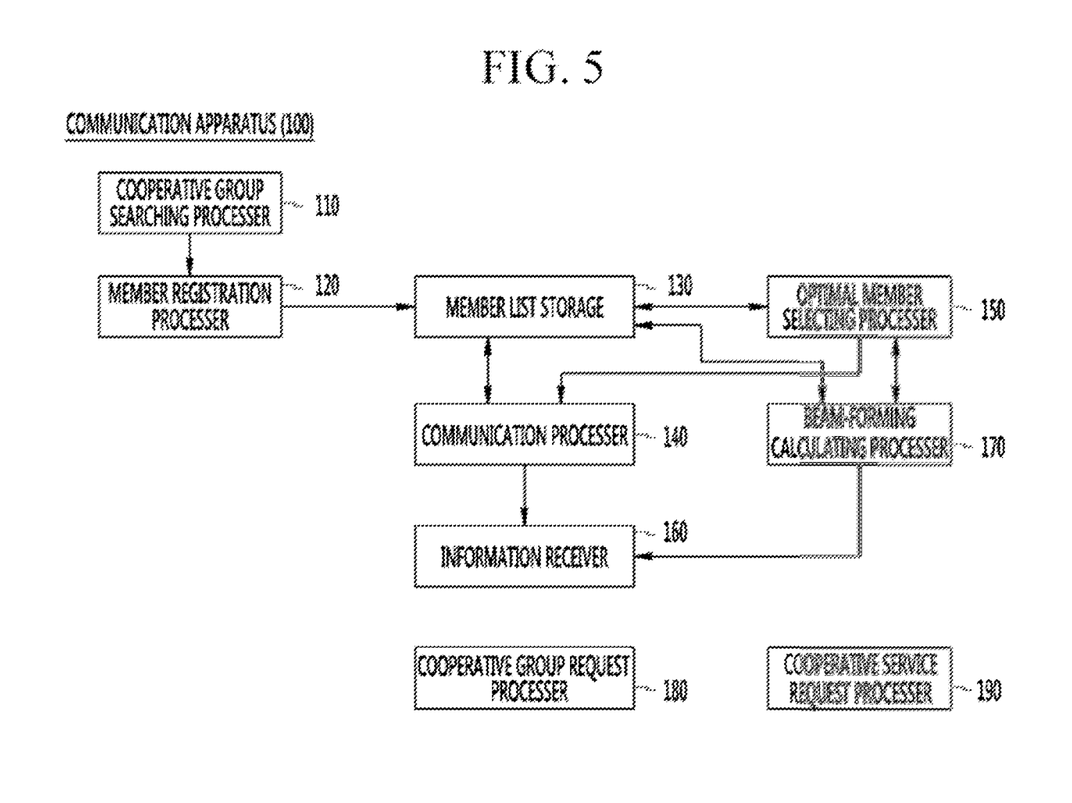
FIG. 5 shows a structure of an apparatus for communication according to an exemplary embodiment of the present invention.

FIG. 5 shows a structure of an apparatus for communication according to an exemplary embodiment of the present invention.

A communication apparatus 100 according to an exemplary embodiment of the present invention, as shown in FIG. 5, includes a cooperative group searching processer 110, a member registration processer 120, a member list storage 130, a communication processer 140, an optimal member selecting processer 150, an information receiver 160, and a beam-forming calculation processer 170.

The cooperative group searching processer 110 searches terminals which receive a service through the same beam by periodically performing signaling.

The member registration processer 120 requests the searched terminals to be a member of the cooperative group and registers the terminals informing of accepting the request as members of the cooperative group. The member registration processer 120 performs member registration processing to the in-band cooperative group and the out-band cooperative group.

The member list storage 130 stores the list of the members of the cooperative groups. The list may be updated at predetermined intervals, and may include pre-selected optimal members of a predetermined number.

The communication processer 140 receives a service from a base station, informs members of the cooperative group of communication link failure requests when link failure occurs, and requests a cooperative service.

At this time, the communication processer 140 may request a cooperative service from the terminal corresponding to the optimal member selected by the optimal member selecting processer 150.

The optimal member selecting processer 150 selects an optimal member from the cooperative group. The optimal member selecting processer 150 may select an optimal member from the pre-stored in-band cooperative group or select an optimal member from the out-band cooperative group when there is no optimal member within the in-band cooperative group. The optimal member selecting processer 150 may select the optimal member of the predetermined number (the optimal number of cooperative group members) in consideration of channel links between the base station and the cooperative group members, and channel links between a corresponding terminal and the cooperative group members The information receiver 160 receives a service from the base station, and particularly, receives a service from the member of the cooperative group having received the request from the communication processer 140 when the communication link failure occurs.

The beam-forming calculation processer 170 may calculate beam-forming information on the members of the cooperative group in advance. The beam-forming calculation processer 170 calculates and stores beam-forming information (e.g., a beam index or phase information), and updates it at predetermined intervals. The beam-forming calculation processer 170 may calculate and manage the beam-forming information on the members of the predetermined number rather than all members of the cooperative group.

For the case in which it operates as a member of the cooperative group for other terminals, the communication apparatus 100 may further include, as shown in FIG. 5, a cooperative group request processor 180 and a cooperative service request processor 190.

The cooperative group request processor 180 determines whether or not to accept a request when receiving the request for cooperative group member registration from other terminals, and informs the result of the determination.

The cooperative service request processor 190 requests the base station to provide a service for the terminal in which communication link failure occurs when the terminal accepts the request of the cooperative group member registration and requests a cooperative service. The cooperative service request processor 190 receives the information according to a service for the terminal in which communication link failure occurs from the base station and transmits it to the terminal.

According to an exemplary embodiment of the present invention, in a mobile communication system with a millimeter band, it is possible to communicate through an in-band/out-band cooperative group even if communication link failure occurs by unanticipated instantaneous movement or motion of things around a terminal or the terminal users own instantaneous movement or motion, in a mobile communication system of millimeter bands.

Particularly, in a next generation mobile communication system with SHF/EHF bands, it is possible to prevent communication link failure by communication with cooperative group members included in a pre-searched and updated list if an LOS communication link is blocked by unanticipated instantaneous movement or motion of things around a terminal or the terminal users own instantaneous movement or motion when the terminal receives a service from a base station.

In addition, a first terminal calculates and stores beam-forming information on optimal members of the cooperative group in advance and a second terminal selected as the optimal member also calculates and stores beam-forming information the first terminal having selected the second terminal as the optimal member. Accordingly, the terminal in which communication link failure occurs may instantly communicate with the optimal member.

The exemplary embodiment of the present invention described above is implemented not only by an apparatus and a method, but also by a program realizing a function corresponding to a configuration of the exemplary embodiment of the present invention or a recording medium recording the program. The above implementation may be achieved by a person of ordinary skill in the art based on the description of the above embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for communication in a millimeter band communication system, comprising:
    obtaining, by a first terminal, a list including members of a cooperative group in which terminals receive a service with the same beam as the first terminal's beam;

informing, by the first terminal, a second terminal, corresponding to a member of the list, of communication link failure when the failure occurs, and requesting a cooperative service;

receiving, by the first terminal, information corresponding to a service provided from a base station through the second terminal, requesting, by the first terminal, a cooperative service from a third terminal having a cooperative group in which the first terminal is included as a member;

informing, by the first terminal, the base station of the third terminal's communication link failure and requesting a service for the third terminal through a radio resource allocated to the first terminal; and receiving, by the first terminal, the service for the third terminal from the base station and sending the service to the third terminal, wherein the communication link failure is a result of a motion of the first terminal such that a line of sight (LOS) between the first terminal and the base station is lost in the absence of a LOS impeding structure, and wherein the obtaining of a list obtains the list through signaling at a predetermined period or when the first terminal recognizes its movement or motion.

2. The method of claim 1, wherein the obtaining of a list comprises:

searching, by the first terminal, terminals receiving a service with the same beam as the first terminal's beam by signaling at a predetermined period or when recognizing its movement or motion;

requesting, by the first terminal, the searched terminals to be registered as members of its cooperative group; and registering, by the first terminal, the terminals informing of accepting the request as members of the cooperative group, and storing them in the list.

3. The method of claim 1, wherein the obtaining of a list performs searching and registering a cooperative group member for in-band terminals, and further performs searching and registering a cooperative group member for out-band terminals.

4. The method of claim 1, wherein the requesting of a cooperative service comprises:

selecting an optimal member from among the list; and informing the selected optimal member of communication link failure and requesting a cooperative service.

5. The method of claim 4, wherein the selecting of an optimal member comprises selecting optimal members of a predetermined number in consideration of channel links between the base station and the cooperative group members of the list and channel links between the first terminal and the cooperative group members.

6. The method of claim 4, further comprising calculating beam-forming information that includes a beam index of each of the cooperative group members of the list or phase information for beam-forming.

7. The method of claim 6, wherein beam-forming information on an optimal member among the cooperative group members of the list is calculated and stored.

8. The method of claim 1, wherein the receiving of the service comprises receiving the service through a radio resource additionally allocated to the first terminal and sending the service to the third terminal.

9. An apparatus for a terminal to communicate in a millimeter band communication system, comprising:

a cooperative group searching processer that searches members of a cooperative group including terminals which receive a service through the same beam;

a member list storage that stores a list of the members of the cooperative group;

a communication processer that selects a member from the list when communication link failure occurs, informs a terminal corresponding to the selected member of the communication link failure, and requests a cooperative service;

an information receiver that receives information corresponding to a service from a base station through the corresponding terminal from the selected member, a cooperative group request processer that determines whether or not to accept a request when receiving the request for cooperative group member registration from an adjacent terminal, and informs the results of the determination; and a cooperative service request processer that requests the base station to provide a service for the adjacent terminal accepting the request for cooperative group member registration when the adjacent terminal informs of communication link failure, receives the service, and transmits it to the adjacent terminal, wherein the communication link failure is a result of a motion of the terminal such that a line of sight (LOS) between the terminal and the base station is lost in the absence of a LOS impeding structure.

10. The apparatus of claim 9, further comprising a member registration processer that requests a searched terminal to be a member of the cooperative group, and registers the terminal when informing of acceptance of the request as a member of the cooperative group.

11. The apparatus of claim 9, further comprising an optimal member selecting processer that selects an optimal member from the list, wherein the communication processer informs a terminal corresponding to the selected optimal member of communication link failure and requests a cooperative service.

12. The apparatus of claim 11, wherein the optimal member selecting processer selects the optimal member of a predetermined number in consideration of channel links between the base station and the cooperative group members of the list and channel links between the terminal of the apparatus and the cooperative group members.

13. The apparatus of claim 9, further comprising a beam-forming calculation processer that calculates beam-forming information that includes a beam index of each of the cooperative group members of the list or phase information for beam-forming.

14. The apparatus of claim 11, wherein the list includes a cooperative group member list of in-band terminals and a cooperative group member list of out-band terminals.

15. The apparatus of claim 14, wherein the optimal member selecting processer first performs a process of selecting an optimal member from the cooperative group member list of in-band terminals, and then performs a process of selecting an optimal member from the cooperative group member list of out-band terminals when there is no optimal member in the cooperative group member list of in-band terminals.

16. A method for communication in a millimeter band communication system, comprising:

obtaining, by a first terminal, a list including members of a cooperative group in which terminals receive a service with the same beam as the first terminal's beam;

requesting, by the first terminal, a cooperative service from a second terminal having a cooperative group in which the first terminal is included as a member;

informing, by the first terminal, the base station of the second terminal's communication link failure and requesting a service for the second terminal through a radio resource allocated to the first terminal;

receiving, by the first terminal, the service for the second terminal from the base station and sending the service to the second terminal, requesting, by the first terminal, a cooperative service from a third terminal having a cooperative group in which the first terminal is included as a member;

informing, by the first terminal, the base station of the third terminal's communication link failure and requesting a service for the third terminal through a radio resource allocated to the first terminal; and receiving, by the first terminal, the service for the third terminal from the base station and sending the service to the third terminal, wherein the communication link failure is a result of a motion of the second terminal such that a line of sight (LOS) between the second terminal and the base station is lost in the absence of a LOS impeding structure.

17. The method of claim 16, wherein the receiving of the service comprises receiving the service through a radio resource additionally allocated to the first terminal and sending the service to the second terminal.

* * * * *